United States Patent
Yoshikawa et al.

(10) Patent No.: US 11,900,331 B2
(45) Date of Patent: Feb. 13, 2024

(54) INFORMATION PROCESSING APPARATUS, INFORMATION PROCESSING METHOD, AND VEHICLE

(71) Applicant: TOYOTA JIDOSHA KABUSHIKI KAISHA, Toyota (JP)

(72) Inventors: Katsuhisa Yoshikawa, Toyota (JP); Yuji Suzuki, Kariya (JP); Keita Yamazaki, Nisshin (JP); Kei Matsumoto, Toyota (JP); Hiroyuki Ito, Nagoya (JP); Takashi Ogawa, Toyota (JP); Yukiya Sugiyama, Toyota (JP); Masaru Ando, Seto (JP); Yasushi Fujiwara, Toyota (JP); Azusa Nakagame, Kariya (JP); Erina Toyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 592 days.

(21) Appl. No.: 17/109,542

(22) Filed: Dec. 2, 2020

(65) Prior Publication Data
US 2021/0174311 A1 Jun. 10, 2021

(30) Foreign Application Priority Data
Dec. 5, 2019 (JP) ................. 2019-220276

(51) Int. Cl.
*G06Q 10/20* (2023.01)
*G06Q 10/0631* (2023.01)
(Continued)

(52) U.S. Cl.
CPC ............ *G06Q 10/20* (2013.01); *B60P 3/0257* (2013.01); *G05D 1/0088* (2013.01);
(Continued)

(58) Field of Classification Search
CPC .. G06Q 10/20; G06Q 10/06315; G06Q 20/18; G06Q 20/203; G06Q 50/28; B60P 3/0257; G05D 1/0088; G07F 9/026
(Continued)

(56) References Cited

U.S. PATENT DOCUMENTS

| 6,167,327 A | * | 12/2000 | Broker ...................... G07F 9/02 700/238 |
| 2018/0244387 A1 | * | 8/2018 | Russell .................. G06V 20/13 |

(Continued)

FOREIGN PATENT DOCUMENTS

| DE | 102009057693 A1 | 5/2011 |
| JP | 57-142644 U | 9/1982 |

(Continued)

*Primary Examiner* — Krishnan Ramesh
(74) *Attorney, Agent, or Firm* — Sughrue Mion, PLLC (57) ABSTRACT

An information processing apparatus disclosed has a controller configured to execute the processing of, when a first vehicle body unit on which a first vending machine is mounted is laid at a specific place, determining a time for maintenance defined as a time to perform maintenance of the first vending machine, and sending a replacement command to a chassis unit that is configured in such a way as to be capable of travelling autonomously and being coupled to and separated from a vehicle body unit, as per the time for maintenance. The replacement command is a command to transport a second vehicle body unit on which a second vending machine is mounted to the specific place and retrieve the first vehicle body unit from the specific place.

15 Claims, 7 Drawing Sheets

(51) Int. Cl.

| | | |
|---|---|---|
| *G06Q 50/28* | (2012.01) | |
| *G06Q 20/18* | (2012.01) | |
| *G06Q 20/20* | (2012.01) | |
| *G05D 1/02* | (2020.01) | |
| *G07F 17/00* | (2006.01) | |
| *G07F 9/02* | (2006.01) | |
| *G05D 1/00* | (2006.01) | |
| *B60P 3/025* | (2006.01) | |
| *G06Q 30/0645* | (2023.01) | |

(52) U.S. Cl.
CPC ......... *G05D 1/0212* (2013.01); *G05D 1/0291* (2013.01); *G06Q 10/06315* (2013.01); *G06Q 20/18* (2013.01); *G06Q 20/203* (2013.01); *G06Q 30/0645* (2013.01); *G06Q 50/28* (2013.01); *G07F 9/026* (2013.01); *G07F 17/0042* (2013.01)

(58) Field of Classification Search
USPC ....................................................... 701/29.1
See application file for complete search history.

(56) References Cited

U.S. PATENT DOCUMENTS

| | | |
|---|---|---|
| 2019/0193721 A1 | 6/2019 | Yamamuro et al. |
| 2021/0090376 A1* | 3/2021 | Ohta ..................... G06Q 10/20 |
| 2021/0147202 A1* | 5/2021 | Black ................... G05D 1/0212 |
| 2021/0382476 A1* | 12/2021 | Morrison ............... G05D 1/005 |
| 2022/0024603 A1* | 1/2022 | Keene .................... G01G 19/12 |

FOREIGN PATENT DOCUMENTS

| | | |
|---|---|---|
| JP | 2001-250153 A | 9/2001 |
| JP | 2016-184321 A | 10/2016 |
| JP | 2019-116251 A | 7/2019 |

* cited by examiner

| CHASSIS ID | PRESENT LOCATION | STATUS |
|---|---|---|
| C001 | ——— | TRANSPORTING |
| C002 | ——— | RETRIEVING |
| C003 | ——— | STANDBY |
| ⋮ | ⋮ | ⋮ |

[Fig. 9]

INFORMATION PROCESSING APPARATUS, INFORMATION PROCESSING METHOD, AND VEHICLE

CROSS-REFERENCE TO RELATED APPLICATIONS

This application claims the benefit of Japanese Patent Application No. 2019-220276, filed on Dec. 5, 2019, which is hereby incorporated by reference herein in its entirety.

BACKGROUND

Technical Field

This disclosure pertains to technologies relating to maintenance of vending machines.

Description of the Related Art

There are known separable vehicles constructed by combining a plurality of separable units (see, for example, Patent Document 1 in the citation list below).

CITATION LIST

Patent Literature

Patent Literature 1: DE 10 2009 057 693

SUMMARY

An object of this disclosure is to provide a technology that enables efficient maintenance of vending machines.

Disclosed herein is an information processing apparatus. The information processing apparatus may comprise a controller configured to execute the processing of:

when a first vehicle body unit on which a first vending machine is mounted is laid at a specific place, determining a time for maintenance defined as a time to perform maintenance of the first vending machine; and sending a replacement command to a chassis unit that is configured in such a way as to be capable of travelling autonomously and being coupled to and separated from a vehicle body unit, as per the time for maintenance, the replacement command being a command to transport a second vehicle body unit on which a second vending machine is mounted to the specific place and retrieve the first vehicle body unit from the specific place.

Also disclosed herein is an information processing method. The information processing method may comprise the steps of processing executed by a computer of:

when a first vehicle body unit on which a first vending machine is mounted is laid at a specific place, determining a time for maintenance defined as a time to perform maintenance of the first vending machine; and sending a replacement command to a chassis unit that is configured in such a way as to be capable of travelling autonomously and being coupled to and separated from a vehicle body unit, as per the time for maintenance, the replacement command being a command to transport a second vehicle body unit on which a second vending machine is mounted to the specific place and retrieve the first vehicle body unit from the specific place.

Also disclosed herein is a vehicle. The vehicle may comprise a controller configured to execute the processing of:

when a first vehicle body unit on which a first vending machine is mounted is laid at a specific place, determining a time for maintenance defined as a time to perform maintenance of the first vending machine; and causing the vehicle to transport a second vehicle body unit on which a second vending machine is mounted to the specific place and retrieve the first vehicle body unit from the specific place as per the maintenance time.

Also disclosed herein is an information processing program configured to cause a computer to implement the above information processing method and a non-transitory storage medium in which this information processing program is stored in a computer-readable manner.

The present disclosure can provide a technology that enables efficient maintenance of vending machines.

DESCRIPTION OF THE EMBODIMENTS

What is intended by this disclosure is to improve the efficiency of maintenance of vending machines by using separable vehicles in service of vending machines. In this disclosure, the term "vending machines" shall refer to machines or apparatuses that provide goods (products) or services automatically (without human intervention) in exchange for payment of fees by users.

When a vending machine is in operation at a certain place, it is necessary to do appropriate maintenance thereof, such as replenishment of goods, replacement of goods, inspection and maintenance of goods, and inspection and maintenance of the vending machine. Conventionally, such maintenance is usually performed at the place where the vending machine is installed. Therefore, it is necessary for a serviceperson to go to the place where the vending machine is installed, making it difficult to do maintenance efficiently. Therefore, vending machines are rarely installed at remote locations that require long travelling time thereto for servicepersons.

To solve the above problem, a technology disclosed herein uses a separable vehicle in service of vending machines. The separable vehicle includes a vehicle body unit on which a vending machine is mounted and a chassis unit that can be coupled to and separated from the vehicle body unit and can travel autonomously. When the vending machine is put into operation at a certain place, the vehicle body unit separated from the chassis unit is left stationary at that place.

When the vending machine is put into operation at a specific place, the vehicle body unit might be left coupled with the chassis unit. However, this prevents the effective use of the chassis unit while the vending machine is in operation. Moreover, this mode of operation requires chassis units as many as vehicle body units on which vending machines are mounted, thereby requiring an increased cost of equipment. In contrast, if the vehicle body unit alone is left stationary with the chassis unit decoupled, one chassis unit can be used with a plurality of vehicle body units. This mode allows the chassis unit to be used efficiently while the vending machine is in operation and the cost of equipment to be reduced.

When the vehicle body unit is set stationary at a specific place as mentioned above, in other words when the vending machine mounted on the vehicle body unit is in operation at the specific place, a controller of an information processing apparatus determines a time to perform maintenance of the vending machine (which will be referred to as "time for maintenance" hereinafter). The controller sends to the chassis unit a replacement command as per the time for maintenance determined as above. The replacement command is a command to replace the vehicle body unit presently set at the specific place (first vehicle body unit) with another vehicle body unit (second vehicle body unit). In other words, the replacement command is a command to transport the second vehicle body unit to the specific place and to retrieve the first vehicle body unit from the specific place. Mounted on the second vehicle body unit is a vending machine (second vending machine) other than the vending machine (first vending machine) mounted on the first vehicle body unit. The second vending machine is one for which maintenance has been completed.

When receiving the aforementioned replacement command, the chassis unit operates pursuant to the replacement command to transport the second vehicle body unit to the specific place, set it stationary at the specific place, and retrieve the first vehicle body unit from the specific place. Thus, the vending machine set at the aforementioned place is changed from the first vending machine to the second vending machine. In consequence, the specific place continues to have a vending machine operating in a maintained condition. The first vehicle body unit retrieved by the chassis unit can be subjected to maintenance at a desired place. This allows a serviceperson to perform maintenance of the vending machine without going to the specific place.

The aforementioned replacement command may include the following five commands:

first command: a command to couple the chassis unit with the second vehicle body unit second command: a command to cause the chassis unit to travel to a specific place third command: a command to separate the chassis unit from the second vehicle body unit fourth command: a command to couple the chassis unit with the first vehicle body unit at the specific place fifth command: a command to cause the chassis unit to travel to a place (service site) where maintenance of the first vending machine is to be performed After receiving the replacement command as above, the chassis unit firstly operates pursuant to the first command to couple itself with the second vehicle body unit. The operation of coupling the chassis unit and the second vehicle body unit together may be carried out by an external apparatus provided with a heavy machine, such as a lift or crane. Alternatively, the operation of coupling the chassis unit and the second vehicle body unit together may be carried out by an apparatus that the chassis unit or the second vehicle body unit has. After the chassis unit and the second vehicle body unit are coupled together in this way the chassis unit travels by autonomous driving pursuant to the second command to transport the second vehicle body unit to the specific place. Then, the chassis unit operates pursuant to the third command to separate the second vehicle body unit from the chassis unit. Thus, the second vehicle body unit is set stationary at the specific place. The operation of separating the chassis unit and the second vehicle body unit may be carried out by either an external apparatus like the one mentioned above or an apparatus that the chassis unit or the second vehicle body unit has. After the chassis unit and the second vehicle body unit are separated, the chassis unit operates pursuant to the fourth command to couple itself with the first vehicle body unit. The operation of coupling the chassis unit and the first vehicle body unit may be carried out by either an external apparatus like the one mentioned above or an apparatus that the chassis unit or the first vehicle body unit has. After the chassis unit and the first vehicle body unit are coupled together in this way, the chassis unit travels by autonomous driving pursuant to the fifth command to transport the first vehicle body unit to the service site. The operation of the chassis unit pursuant to the first to fifth commands enables automatic replacement of the first vending machine set at the specific place with the second vending machine and transportation of the first vending machine to the service site.

The controller of the information processing apparatus may determine the time for maintenance as a time when the number of products in stock in the first vending machine becomes smaller than a predetermined lower limit. Performing the replacement of the first vehicle body unit with the second vehicle body unit as per the time for maintenance determined as above can save the serviceperson's effort of going to the specific place and replenishing the vending machine with products. Information about the number of products in stock in the first vending machine may be sent from the first vending machine or the first vehicle body unit to the information processing apparatus via a network.

According to another mode, the controller of the information processing apparatus may determine the time for maintenance as a time to change products sold by the first vending machine to another kind of products. Performing the replacement of the first vehicle body unit with the second vehicle body unit as per the time for maintenance determined as above can save the serviceperson's effort of going to the specific place and changing the products sold by the vending machine. The time to change the products may be determined based on, for example, the time of starting sale of a new product, the record of sales, or the turn of seasons.

According to another mode, the controller of the information processing apparatus may determine the time for maintenance as a time to perform inspection and maintenance of the products rent out by the first vending machine. Performing the replacement of the first vehicle body unit with the second vehicle body unit as per the time for maintenance determined as above can save the serviceperson's effort of going to the specific place and performing inspection and maintenance of the products. The time to perform inspection and maintenance of the products may be determined based on, for example, the number of times of rental or the elapsed time since the completion of the last inspection and maintenance of the products.

According to another mode, the controller of the information processing apparatus may determine the time for maintenance as a time to perform inspection and maintenance of the first vending machine. Performing the replacement of the first vehicle body unit with the second vehicle body unit as per the time for maintenance determined as above can save the serviceperson's effort of going to the specific place and performing inspection and maintenance of the vending machine. The time to perform inspection and maintenance of the first vending machine may be determined based on, for example, the operation time of the vending machine since the completion of the last inspection and maintenance thereof.

According to another mode, the controller of the information processing apparatus may determine the time for maintenance as a time when the remaining capacity of a battery that supplies electrical power on which the first vending machine operates becomes lower than a predetermined lower limit. If the vehicle body unit or the vending machine is equipped with a battery that powers the vending machine, the vending machine can operate even in places where power supply is not available. However, when the remaining capacity of the battery becomes small, it is necessary to charge or replace the battery. If the time for maintenance is determined as a time when the remaining capacity of the battery becomes smaller than a predetermined lower limit, the first vehicle body unit will be replaced with the second vehicle body unit as per this time. This can save the serviceperson's effort of going to the specific place and charging or replacing the battery. Information about the remaining capacity of the battery may be sent from the first vending machine or the first vehicle body unit to the information processing apparatus via a network.

According to another mode, the controller of the information processing apparatus may determine the time for maintenance as a time when a trouble occurs in the first vending machine. Performing the replacement of the first vehicle body unit with the second vehicle body unit as per the time for maintenance determined as above can save the serviceperson's effort of going to the specific place and repairing the vending machine. Information about troubles of the first vending machine may be sent from the first vending machine or the first vehicle body unit to the information processing apparatus via a network.

According to another mode, the controller of the information processing apparatus may determine the time for maintenance as a time when the number of coins and/or bills for change stored in the first vending machine becomes smaller than a predetermined lower limit. Performing the replacement of the first vehicle body unit with the second vehicle body unit as per the time for maintenance determined as above can save the serviceperson's effort of going to the specific place and replenishing coins and/or bills. Information about the amount of coins and/or bills for change stored in the first vending machine may be sent from the first vending machine or the first vehicle body unit to the information processing apparatus via a network.

In the following, a specific embodiment of the present disclosure will be described with reference to the drawings. It should be understood that dimensions, materials, shapes, relative arrangements, and other features of the component that will be described in connection with the embodiments are not intended to limit the technical scope of the present disclosure only to them, unless otherwise stated.

Embodiment

What will be described in the following is an embodiment of the information processing apparatus according to this disclosure, where the information processing apparatus is applied to a system configured to provide maintenance service for vending machines. Such a system will also be referred to as a vending machine system.

[General Configuration of Vending Machine System]

Figure 1:
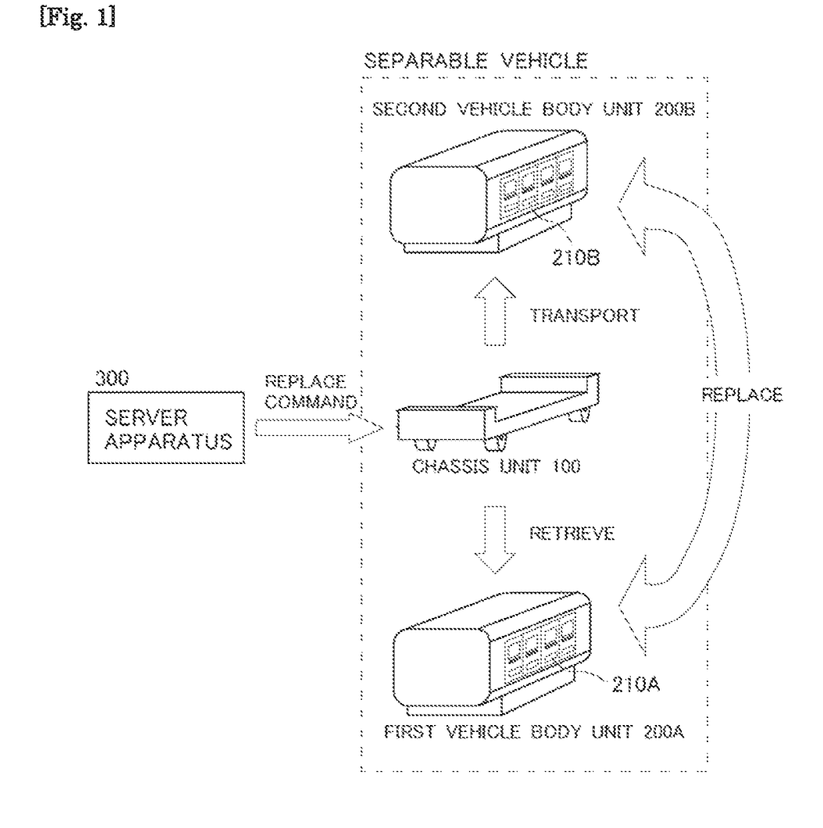
FIG. 1 is a diagram illustrating the general configuration of a vending machine system.
Figure 2:
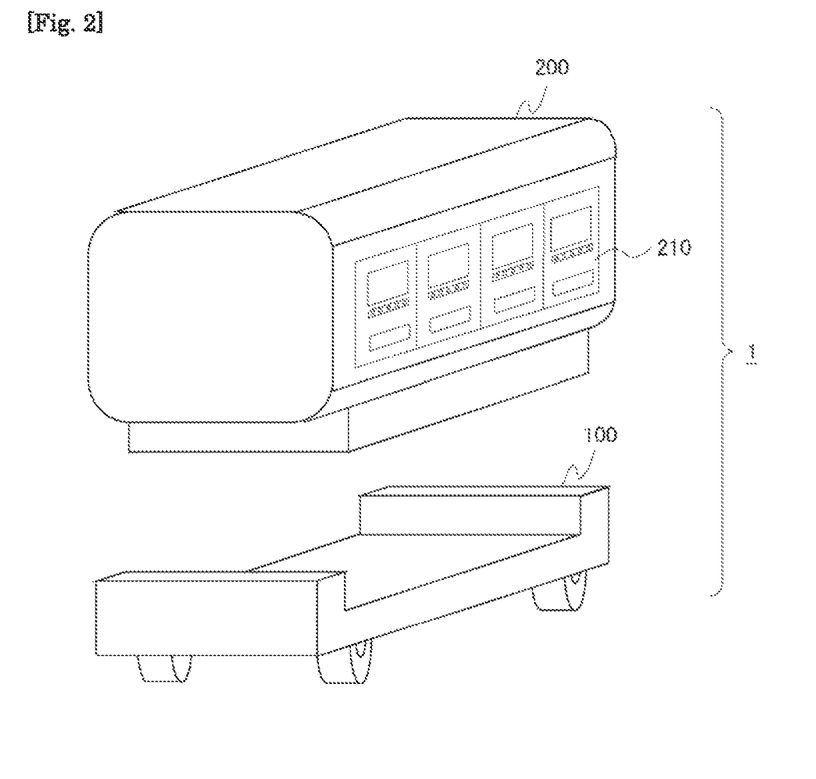
FIG. 2 is a diagram schematically illustrating the structure of a separable vehicle.

FIG. 1 is a diagram illustrating a vending machine system. The vending machine system according to the embodiment is configured to provide maintenance service for vending machines using a separable vehicle 1. As illustrated in FIG. 2, the separable vehicle 1 includes as components a chassis unit 100 capable of travelling autonomously by autonomous driving and a vehicle body unit 200 on which a vending machine 210 is mounted. The chassis unit 100 and the vehicle body unit 200 of the separable vehicle 1 can be coupled with and separated from each other. The chassis unit 100 and the vehicle body unit 200 are managed by a server apparatus 300. The vending machine 210 is a machine or apparatus that provides goods (products) or services automatically in exchange for payment of fees by users. An example of the vending machine 210 as such is a machine that sells products, such as foods, drinks, clothes, toys, or stationery. Another example of the vending machine 210 is a machine that provides the service of renting out certain products, such as bicycles. In the following, a system including vending machines that sell products will be described by way of example.

In the system of this embodiment, the vehicle body unit 200 is set at a specific place to sell products by the vending machine 210. Specifically, the vehicle body unit 200 is set stationary at that place with the chassis unit 100 separated from it. The reason why the vehicle body unit 200 is left separated from the chassis unit is to allow efficient use of the chassis unit 100 and to reduce the cost of equipment. The specific place is a place where the vending machine is demanded, which may be changed when necessary.

As products are sold by the vending machine 210, the number of products in stock in the vending machine 210 decreases, and the need for replenishment of products arises eventually. Then, the system according to the embodiment replaces the vending machine set at the specific place together with the vehicle body unit. For example, in the case where a first vehicle body unit 200A is set stationary at a specific place, the first vehicle body unit 200A is replaced by a second vehicle body unit 200B when the number of products in stock in the vending machine (first vending machine) 210A mounted on the first vehicle body unit 200A becomes smaller than a predetermined lower limit. The second vehicle body unit 200B is a vehicle body unit on which a vending machine (second vending machine) 210B that has been replenished with products is mounted.

The operation of replacing the first vehicle body unit 200A with the second vehicle body unit 200B is carried out by the chassis unit 100 operating under the management of the server apparatus 300. Specifically, the server apparatus 300 sends to the chassis unit 100 a command (replacement command) to transport the second vehicle body unit 200B to the specific place and retrieve the first vehicle body unit 200A from the specific place. Then, the chassis unit 100 operates pursuant to the replacement command sent from the server apparatus 300 to replace the first vehicle body unit 200A with the second vehicle body unit 200B. Moreover, the chassis unit 100 retrieves the first vehicle body unit 200A from the specific place and transports it to a certain service site. The service site is a place where service for vending machines is performed. Specifically, services such as replenishment of products, inspection, and maintenance are performed for the vending machines 210. The number of such service sites is not limited to one. For example, a plurality of areas may have respective service sites.

[Hardware Configuration of Vending Machine System]

Figure 3:
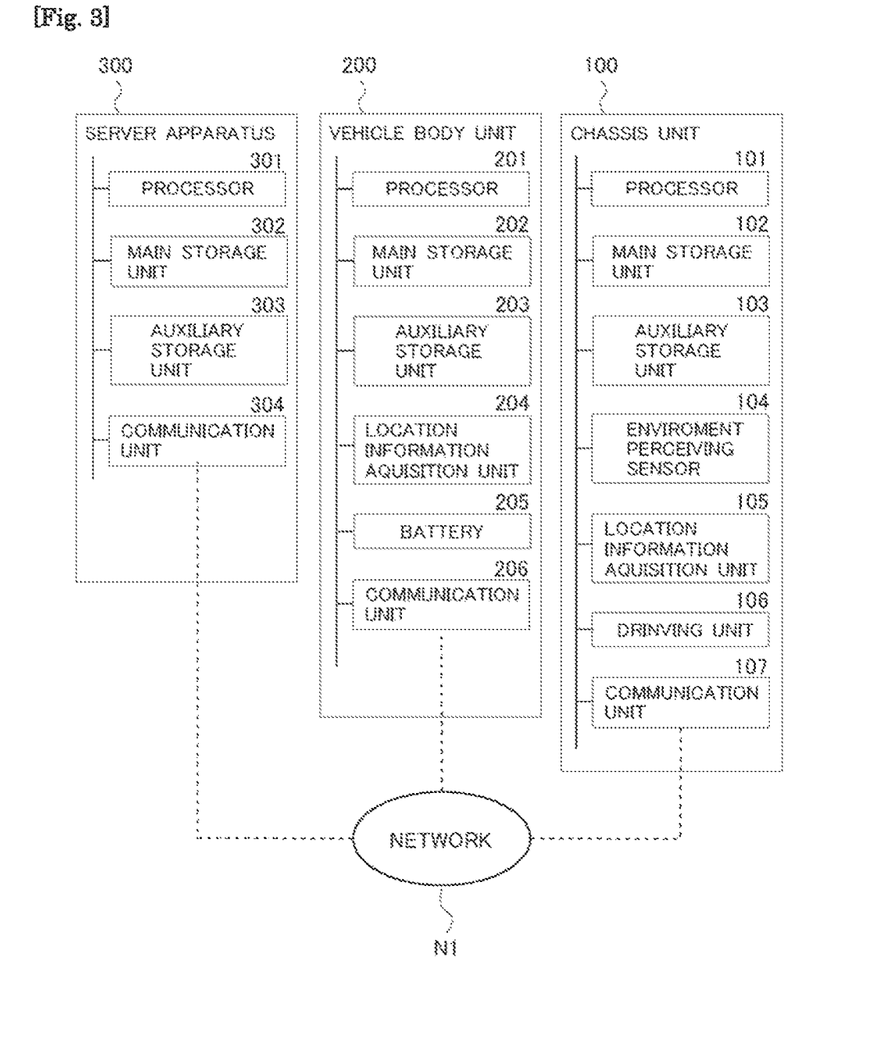
FIG. 3 is a diagram illustrating the hardware configurations of a chassis unit, a vehicle body unit, and a server apparatus.

Components of the vending machine system will be described specifically. FIG. 3 is a diagram illustrating the hardware configurations of the chassis unit 100, the vehicle body unit 200, and the server apparatus 300 shown in FIG. 2. While FIG. 3 illustrates only one chassis unit 100 and only one vehicle body unit 200, the number of chassis units 100 and the number of vehicle body units 200 under the management of the server apparatus 300 may be two or more.

The chassis unit 100 of the separable vehicle 1 travels autonomously on the road pursuant to an operation command. The chassis unit 100 has a processor 101, a main storage unit 102, an auxiliary storage unit 103, an environment perceiving sensor 104, a location information acquisition unit 105, a driving unit 106, and a communication unit 107. The chassis unit 100 is an electric car driven by an electric motor as a power engine. The power engine of the chassis unit 100 is not limited to an electric motor, but it may be an internal combustion engine or a hybrid system of an internal combustion engine and an electric motor.

The processor 101 may be, for example, a CPU (Central Processing Unit) or a DSP (Digital Signal Processor). The processor 101 controls the chassis unit 100 and executes computation of various information processing. The main storage unit 102 may include a RAM (Random Access Memory), a ROM (Read Only Memory) and/or the like. The auxiliary storage unit 103 may include, for example, an erasable programmable ROM (EPROM) or a hard disk drive (HDD). The auxiliary storage unit 103 may include a removable medium, in other words, a portable recording medium. Examples of the removable medium include a USB (Universal Serial Bus) memory and disc recording media, such as a CD (Compact Disc) and a DVD (Digital Versatile Disc).

What is stored in the auxiliary storage unit 103 includes various programs, various data, and various tables, which can be written into and read out from the auxiliary storage unit 103 when necessary. The auxiliary storage unit 103 stores an operating system (OS), various programs, and various tables. All or a portion of the aforementioned information and data stored in the auxiliary storage unit 103 may be stored in the main storage unit 102 instead. Likewise, information and data stored in the main storage unit 102 may be stored in the auxiliary storage unit 103 instead.

The environment perceiving sensor 104 is means for sensing the environment of the vehicle, which typically includes a stereo camera, a laser scanner, a LIDAR, a radar, or the like. Information acquired by the environment perceiving sensor 104 is passed to the processor 101.

The location information acquisition unit 105 is a device for acquiring information about the present location of the chassis unit 100, which typically includes a GPS receiver. The location information acquisition unit 105 acquires information about the present location of the chassis unit 100 repeatedly at predetermined intervals. The location information acquired by the positional information acquisition unit 105 is sent to the server apparatus 300 through the communication unit 107, which will be described later. In other words, location information of the chassis unit 100 is sent from the chassis unit 100 to the server apparatus 300 repeatedly at predetermined intervals. Thus, the server apparatus 300 can recognize the present location of each chassis unit 100.

The driving unit 106 is a device that drives the chassis unit 100. The driving unit 106 includes, for example, a power engine, a braking device, and a steering device. The power engine may include an internal combustion engine, an electric motor, or a hybrid system of an internal combustion engine and an electric motor.

The communication unit 107 is a device that connects the chassis unit 100 to a network N1. The communication unit 107 connects itself with the network N1 using mobile communications, such as 5G (5th Generation) mobile communications or LTE (Long Term Evolution) mobile communications. Alternatively, the communication unit 107 may connect itself with the network using narrow-band communications, such as DSRC (Dedicated Short Range Communications), or WiFi (registered trademark). Thus, the communication unit 107 can communicate with other devices, such as the vehicle body unit 200 and the server apparatus 300, via the network N1. For example, the communication unit 107 sends the present location information acquired by the location information acquisition unit 105 to the server apparatus 300 via the network N1. The network N1 may be, for example, a WAN (Wide Area Network), which may be a global public communication network such as the Internet, or other communication network.

The hardware configuration of the chassis unit 100 is not limited to that illustrated in FIG. 3, but some components may be eliminated, replaced, or added. For example, the chassis unit 100 may be provided with an apparatus used to couple it with and/or separate it from the vehicle body unit 200. Examples of such an apparatus include a heavy machine equipped with a lift or crane and an electromagnet device. Various processing executed by the chassis unit 100 may be executed either by hardware or software.

As described above, the vehicle body unit 200 of the separable vehicle 1 is adapted to carry the vending machine 210 mounted on it. The vehicle body unit 200 has a processor 201, a main storage unit 202, an auxiliary storage unit 203, a location information acquisition unit 204, a battery 205, and a communication unit 206. The processor 201, the main storage unit 202, the auxiliary storage unit 203, the location information acquisition unit 204, and the communication unit 206 are similar to their corresponding components of the chassis unit 100 and therefore will not be described further. The battery 205 is a rechargeable battery, which supplies electrical power to the vending machine 210. The battery 205 may be provided in the vending machine 210.

The hardware configuration of the vehicle body unit 200 is not limited to that illustrated in FIG. 3, but some components may be eliminated, replaced, or added. Various processing executed by the vehicle body unit 200 may be executed by either hardware or software.

The server apparatus 300 is an apparatus that manages the chassis unit 100 and the vehicle body unit 200. The server apparatus 300 constitutes the information processing apparatus in this disclosure. The server apparatus 300 has a configuration as an ordinary computer. The server apparatus 300 has a processor 301, a main storage unit 302, an auxiliary storage unit 303, and a communication unit 304. The processor 301, the main storage unit 302, the auxiliary storage unit 303, and the communication unit 304 are interconnected by busses. The processor 301, the main storage unit 302, and the auxiliary storage unit 303 are similar to their corresponding components of the chassis unit 100 and therefore will not be described further. The communication unit 304 performs communication of information between the server apparatus 300 and external devices. The communication unit 304 may include, for example, a LAN (Local Area Network) interface board or a wireless communication circuit for wireless communication. The LAN interface board or the wireless communication circuit is connected to the network N1. The hardware configuration of the server apparatus 300 is not limited to that illustrated in FIG. 3, but some components may be eliminated, replaced, or added. Various processing executed by the server apparatus 300 may be executed by either hardware or software.

[Functional Configuration of Chassis Unit]

Figure 4:
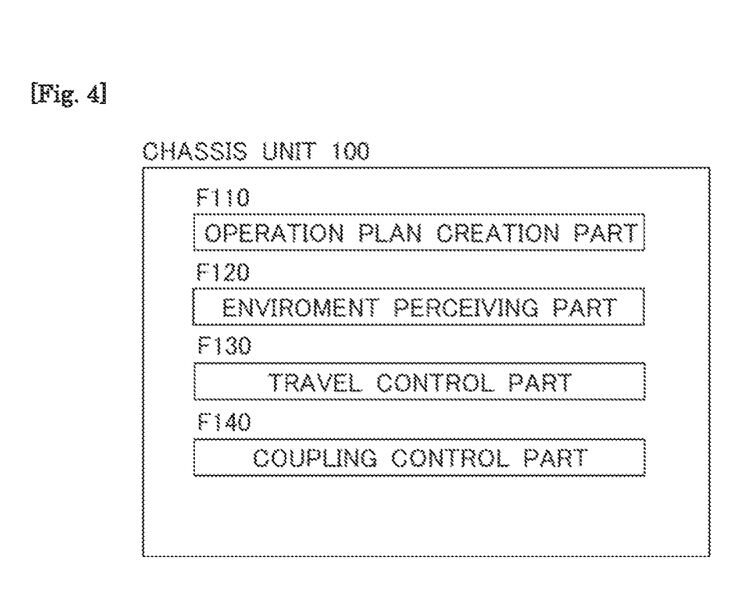
FIG. 4 is a block diagram illustrating the functional configuration of the chassis unit.

The functional configuration of the chassis unit 100 will now be described with reference to FIG. 4. As illustrated in FIG. 4, the chassis unit 100 according to this embodiment includes, as functional components, an operation plan creation part F110, an environment perceiving part F120, a travel control part F130, and a coupling control part F140. The chassis unit 100 implements these functional components by executing programs stored in the main storage unit 102 or the auxiliary storage unit 103 by the processor 101. One or some of the operation plan creation part F110, the environment perceiving part F120, the travel control part F130, and the coupling control part F140 may be implemented entirely or partly by a hardware circuit(s). One or some of the above functional components or a part of the processing of them may be implemented by another computer(s) connected to the network N1. For example, the processing executed as the operation plan creation part F110, the environment perceiving part F120, the travel control part F130, and the coupling control part F140 may be executed by different computers.

The operation plan creation part F110 is configured to create an operation plan of the chassis unit 100 on the basis of an operation command sent from the server apparatus 300. The operation plan is data specifying a route along which the chassis unit 100 is to travel and operation that the chassis unit 100 is to perform in a part or the entirety of the route. Examples of data included in the operation plan are as follows.

(1) data that specifies a route along which the chassis unit 100 is planned to travel (planned travel route) by a set of road links The planned travel route mentioned above may be created, for example, by the operation plan creation part F110 based on the command sent from the server apparatus 300 using map data stored in the auxiliary storage unit 103 or other storage means. The planned travel route may be created using an external service or supplied by the server apparatus 300.

(2) data that specifies an operation(s) to be performed by the chassis unit 100 at a specified location(s) in the planned travel route Examples of the aforementioned specified location include a location where the chassis unit 100 and the vehicle body unit 200 are separated or coupled together and a location to which the vehicle body unit 200 is to be transported. An example of the operation to be performed by the chassis unit 100 at the specific location includes, but is not limited to, separating or coupling together the chassis unit 100 and the vehicle body unit 200.

The environment perceiving part F120 is configured to perceive the environment around the chassis unit 100 using data acquired by the environment perceiving sensor 104. What is perceived by the environment perceiving part F120 includes, but is not limited to, the number and the position of lanes, the number and the position of vehicles present around the chassis unit 100, the number and the position of obstacles present around the chassis unit 100, the structure of the road, and road signs. What is perceived by the environment perceiving part F120 may include anything that is useful for autonomous traveling of the chassis unit 100. The environment perceiving part F120 may be configured to perform tracking of a perceived object. For example, the environment perceiving part F120 may be configured to calculate the relative speed of the perceived object from the difference between the coordinates of the object determined in a previous step and the present coordinates of it.

The travel control part F130 is configured to control the travel of the chassis unit 100 on the basis of the operation plan created by the operation plan creation part F110, environment data created by the environment perceiving part F120, and the location information of the chassis unit 100 acquired by the location information acquisition part 105. For example, the travel control part F130 causes the chassis unit 100 to travel along the planned travel route created by the operation plan creation part F110. In doing so, the travel control part F130 causes the chassis unit 100 to travel so that obstacles will not enter a predetermined safety zone around the chassis unit 100. Any known method may be employed to cause the chassis unit 100 to travel autonomously. Moreover, the travel control part F130 has the function of controlling the travel of the chassis unit 100 pursuant to the command sent from the server apparatus 300.

The coupling control part F140 is configured to control coupling and separation of the chassis unit 100 and the vehicle body unit 200. In the case where coupling and separation of the chassis unit 100 and the vehicle body unit 200 are carried out by an external apparatus, the coupling control part F140 controls this external apparatus by wireless communication or the like to carry out the operations of coupling and separating the chassis unit 100 and the vehicle body unit 200. In the case where the chassis unit 100 is provided with an apparatus that carries out coupling and separation of the chassis unit 100 and the vehicle body unit 200, the coupling control part F140 controls this apparatus to carry out the operations of coupling and separating the chassis unit 100 and the vehicle body unit 200.

[Functional Configuration of Vehicle Body Unit]

Figure 5:
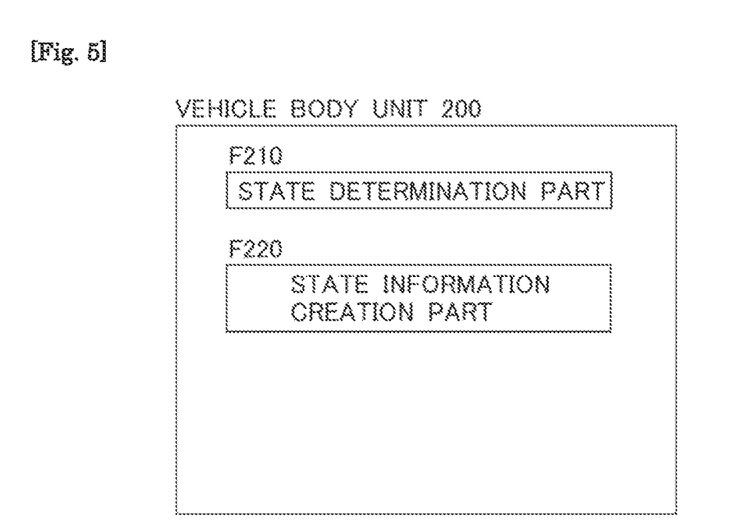
FIG. 5 is a block diagram illustrating the functional configuration of the vehicle body unit.

The functional configuration of the vehicle body unit 200 will be described next with reference to FIG. 5. As illustrated in FIG. 5, the vehicle body unit 200 in the system according to this embodiment includes a state determination part F210 and a state information creation part F220. The vehicle body unit 200 implements these functional components by executing programs stored in the main storage unit 202 or the auxiliary storage unit 203 by the processor 201. The state determination part F210 or the state information creation part F220 may be implemented entirely or partly by a hardware circuit(s). One of the above functional components or a part of the processing of them may be implemented by another computer(s) connected to the network N1. For example, the processing executed as the state determination part F210 and the processing executed as the state information creation part F220 may be executed by different computers.

The state determination part F210 is configured to determine the state of the vending machine 210. In the system according to this embodiment, what is determined as the state of the vending machine 210 is the number of products in stock to be sold by the vending machine 210, and the state determination part F210 determines the number of products in stock every time a product is sold. In the case where a plurality of kinds of products are sold by the vending machine 210, the state determination part F210 determines the number of each kind of products in stock. The number of products in stock determined by the state determination part F210 is passed to the state information creation part F220.

The state information creation part F220 is configured to create state information on the basis of the number of products in stock determined by the state determination part F210. The state information in this embodiment is information including identification data of the vehicle body unit 200, identification data of products, and information about the number of products in stock. The state information created by the state information creation part F220 is sent to the server apparatus 300 through the communication unit 206. Specifically, the state information is sent to the server apparatus 300 every time the number of products in stock is determined by the state determination part F210, in other words, every time a product is sold.

[Functional Configuration of Server Apparatus]

Figure 6:
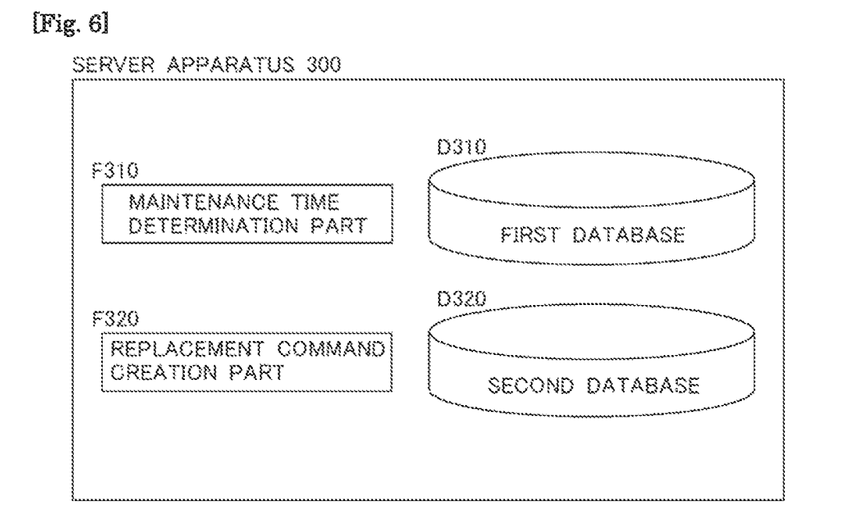
FIG. 6 is a block diagram illustrating the functional configuration of the server apparatus.

The functional configuration of the server apparatus 300 will be described next with reference to FIG. 6. As illustrate in FIG. 6, the server apparatus 300 in the system according to this embodiment includes, as functional components, a time for maintenance determination part F310, a replacement command creation part F320, a first database D310, and a second database D320. The server apparatus 300 implements the time for maintenance determination part F310 and the replacement command creation part F320 by executing programs stored in the main storage unit 302 or the auxiliary storage unit 303 by the processor 301. The time for maintenance determination part F310 or the replacement command creation part F320 may be implemented entirely or partly by a hardware circuit(s). The time for maintenance determination part F310 or the replacement command creation part F320 or a part of the processing of them may be implemented by another computer(s) connected to the network N1. For example, the processing executed as the time for maintenance determination part F310 and the processing executed as the replacement command creation part F320 may be executed by different computers.

The first database D310 and the second database D320 are created by a database management system program (DBMS program) executed by the processor 301. Specifically, the first database D310 and the second database D320 are created by managing data stored in the auxiliary storage unit 303 by the DBMS program. The first database D310 and the second database D320 are, for example, relational databases.

Figure 7:
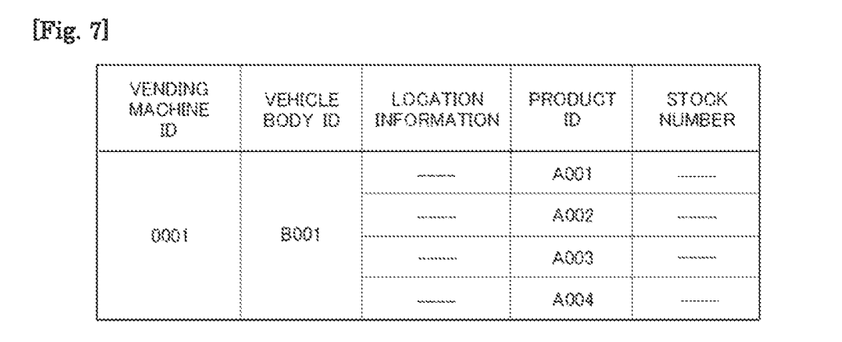
FIG. 7 illustrates an exemplary structure of a stock information table.

What is stored in the first database D310 is information about the numbers of products in stock in vending machines 210 that are in operation (to sell products). The first database D310 stores information about the vending machines 210, information about the vehicle body units 200 on which the vending machines 210 are mounted, and information about the numbers of products in stock, which are linked with each other in the first database D310. An exemplary structure of the information stored in the first database D310 will be described with reference to FIG. 7. FIG. 7 illustrates the structure of a table stored in the first database D310. The structure of the table stored in the first database D310 (which will be also referred to as "stock information table" hereinafter) is not limited to that illustrated in FIG. 7, but some fields may be added, changed, or removed fitly. While FIG. 7 illustrates a table for one vending machine, the first database D310 stores tables as many as the vending machines in operation.

The stock information table in FIG. 7 has the fields of vending machine ID, vehicle body ID, location information, product ID, and number in stock. What is stored in the vending machine ID field is information identifying each vending machine 210 (vehicle body ID). What is stored in the vehicle body ID field is information identifying each vehicle body unit 200 on which the vending machine 210 is mounted (vehicle body ID). What is stored in the location information field is information indicating the location at which the vehicle body unit 200 is set stationary, in other words the location at which the vending machine 210 is installed. The information stored in the location information field may be the address of the place where vehicle body unit 200 is set stationary or information indicating the coordinates on a map (or longitude and latitude) of the place where the vehicle body unit 200 is set stationary. What is stored in the product ID field is information identifying each kind of products sold by the vending machine 210 (product ID). What is stored in the stock number field is information indicating the number of each kind of products in stock. The information stored in the stock number field is updated every time the server apparatus 300 receives the state information from the vehicle body unit 200. In other words, the information stored in the stock number field is updated every time a product is sold by the vending machine 210.

Figure 8:
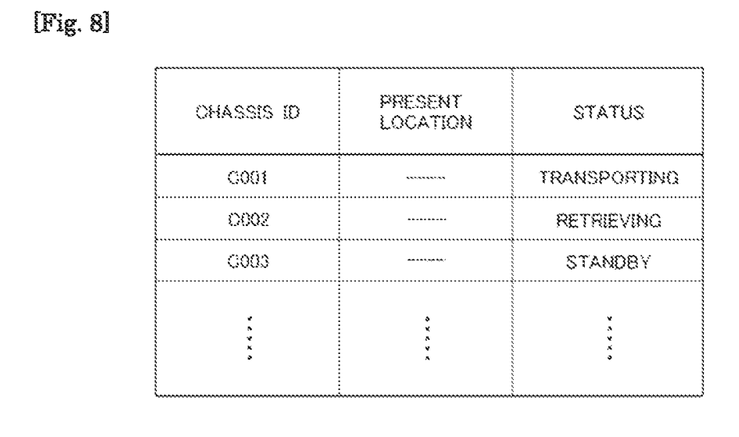
FIG. 8 illustrates an exemplary structure of a chassis information table.

What is stored in the second database D320 is information about the status of the chassis units 100. The second database D320 stores information identifying each chassis unit 100, information indicating the present location of the chassis unit 100, and information indicating the status of the chassis unit 100, which are linked with each other. An exemplary structure of the information stored in the second database D320 will be described with reference to FIG. 8. FIG. 8 illustrates the structure of a table stored in the second database D320. The structure of the table stored in the second database D320 (which will be also referred to as "chassis information table" hereinafter) is not limited to that illustrated in FIG. 8, but some fields may be added, changed, or removed fitly.

The chassis information table in FIG. 8 has the fields of chassis ID, present location, and status. What is stored in the chassis ID field is information identifying each chassis unit 100 (chassis ID). What is stored in the present location field is information indicating the present location of the chassis unit 100. The information stored in the present location field may be the address of the place where each chassis unit 100 is located or information indicating the coordinates on a map (or longitude and latitude) of the place where the chassis unit 100 is located. What is stored in the status field is information indicating the status of each chassis unit 100. For example, while the chassis unit 100 is transporting a vehicle body unit 200, the information "transporting" is stored in the status field. While the chassis unit 100 is retrieving a vehicle body unit 200, the information "retrieving" is stored in the status field. While the chassis unit 100 is on standby at a certain service site, the information "standby" is stored in the status field.

The time for maintenance determination part F310 determines the time for maintenance of each vending machine 210 in operation. In this embodiment, the time for maintenance is the time when it is necessary to replenish the vending machine 210 with products, that is, the time when the number of products in stock becomes smaller than a predetermined lower limit. The predetermined lower limit is a value below which it is necessary to replenish the vending machine 210 with products. The lower limit is set to, for example zero or zero plus a certain margin.

To determine the time for maintenance, the time for maintenance determination part F310 firstly accesses the first database D310 to read out the stock number (i.e. the number of products in stock) stored in the stock number field of the stock information table. Then, the time for maintenance determination part F310 determines whether or not the stock number read out from the stock information table is smaller than the predetermined lower limit. This processing is executed at the time when the information stored in the stock number field of the stock information table is updated. Therefore, the time for maintenance determination part F310 determines whether or not the stock number after the update is smaller than the predetermined lower limit. If the stock number after the update is smaller than the predetermined lower limit, it is determined that it is the time to replenish the relevant vending machine 210 with products (i.e. the time for maintenance). If there is a vending machine 210 for which the time for maintenance is determined, the information stored in the vending machine ID field, the vehicle body ID field, the location information field, and the product ID field of the relevant stock information table is passed to the replacement command creation part F320.

The replacement information creation part F320 creates a command (replacement command) to replace a vending machine for which the time for maintenance is determined with a vending machine which has already been replenished with products. The former vending machine will be referred to as the first vending machine 210A, and the latter vending machine will be referred to as the second vending machine 210B hereinafter. As described before, in the system according to this embodiment, the vending machine is replaced together with the vehicle body unit. In other words, when the first vending machine 210A is replaced with the second vending machine 210B, the vehicle body unit on which the first vending machine 210A is mounted is replaced by the vehicle body unit on which the second vending machine 210B is mounted. In the following, the vehicle body unit on which the first vending machine 210A is mounted will be referred to as the first vehicle body unit 200A, and the vehicle body unit on which the second vending machine 210B is mounted will be referred to as the second vehicle body unit 200B.

The replacement command is a command to transport the second vehicle body unit 200B to the place where the first vehicle body unit 200A is set (which will be referred to as the specific place hereinafter) and retrieve the first vehicle body unit 200A from the specific place. The replacement command includes, for example, the following first to fifth commands:

first command: a command to couple the chassis unit 100 with the second vehicle body unit 200B second command: a command to cause the chassis unit 100 to travel to the specific place third command: a command to separate the chassis unit 100 from the second vehicle body unit 200B fourth command: a command to couple the chassis unit 100 with the first vehicle body unit 200A at the specific place fifth command: a command to cause the chassis unit 100 to travel to a place (service site) where maintenance (i.e. replenishment of products) of the first vehicle body unit 200A is to be performed The replacement command created by the replacement command creation part F320 is sent to a chassis unit 100 through the communication unit 304. The chassis unit 100 to which the replacement command is to be sent is determined based on the chassis information table in the second database D320. For example, the server apparatus 300 selects the chassis unit 100 whose present location stored in the present location field of the chassis information table is closest to the specific place among the chassis units 100 of which the status fields in the chassis information table read "standby" as the chassis unit 100 to which the replacement command is to be sent. The method of determining the chassis unit to which the replacement command is to be sent is not limited to this, but it may be determined in a manner suitable for the mode of operation of the vending machine service. The second vehicle body unit 200B may be prepared at the service site where the chassis unit 100 to which the replacement command is sent is on standby. The second vending machine 210B mounted on the second vehicle body unit 200B is replenished with products same as those sold by the first vending machine 200A.

[Process Performed by the Server Apparatus]

Figure 9:
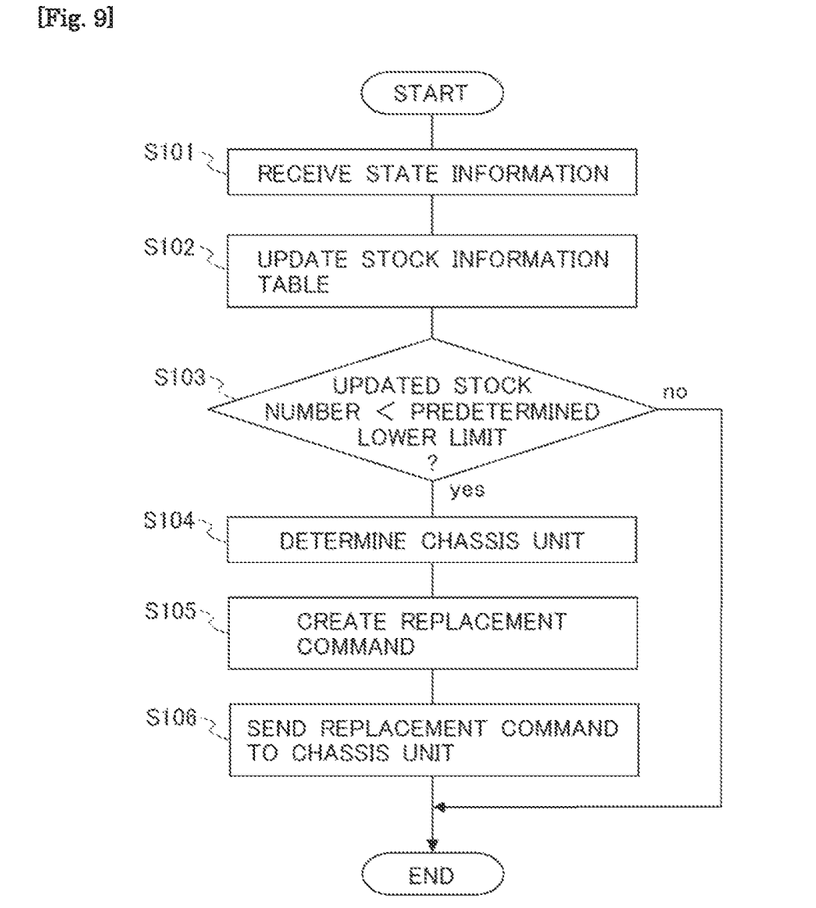
FIG. 9 is a flow chart of a process executed by the server apparatus when it receives status information.

A process performed by the server apparatus 300 according to the embodiment will be described with reference to FIG. 9. FIG. 9 is a flow chart of the process performed by the server apparatus 300 when it receives status information sent from the first vehicle body unit 200A.

In the process according to the flow chart of FIG. 9, when the communication unit 304 of the server apparatus 300 receives status information sent from the first vehicle body unit 200A (step S101), the time for maintenance determination part F310 updates the stock information table in the first database D310 (step S102). Specifically, the time for maintenance determination part F310 accesses the first database D310 with the vending machine ID contained in the status information to find the stock information table associated with the first vending machine 210A. Then, the time for maintenance determination part F310 finds the product identified by the product ID contained in the status information among the products stored in the status information table found as above. Then, the time for maintenance determination part F310 updates the stock number stored in the stock number field associated with the product found above to the stock number contained in the status information.

After the information in the stock number field in the stock information table is updated, the time for maintenance determination part F310 determines whether the updated stock number is smaller than the predetermined lower limit (step S103). If the updated stock number is equal to or larger than the predetermined lower limit (a negative answer in step S103), the server apparatus 300 terminates the process according to the flow chart of FIG. 9. If the updated stock number is smaller than the predetermined lower limit (an affirmative answer in step S103), it means that it is the time to perform maintenance of the first vending machine 210A. Then, the processing of step S104 onward is executed. In this case, the time for maintenance determination part F310 passes the vending machine ID, the vehicle body ID, the location information, and the product IDs stored in the stock information table to the replacement command creation part F320.

The replacement command creation part F320 determines the chassis unit 100 to be employed for the operation of replacing the first vehicle body unit 200A (step S104). Specifically, the replacement command creation part F320 accesses the second database D320 to extract chassis information tables whose status fields read "standby". Then, the replacement command creation part F320 picks up the chassis information table of which the present location indicated in the present location field is closest to the location of the first vehicle body unit 200A from among the extracted chassis information tables. Then, the replacement command creation part F320 reads out the chassis ID stored in the chassis ID field of the picked-up chassis information table. Then, the replacement command creation part F320 selects the chassis unit 100 identified by the read-out chassis ID as the chassis unit employed for the operation of replacing the first vehicle body unit 200A.

The replacement command creation part F320 creates a replacement command to be given to the chassis unit 100 selected in step S104 (step S105). This replacement command includes the aforementioned first to fifth commands. In this case, the first command is a command to couple the selected chassis unit 100 with the second vehicle body unit 200B at the service site at which the chassis unit 100 is on standby. The second command is a command to cause the chassis unit 100 to travel from the aforementioned service site to the location of the first vehicle body unit 200A (or the specific place). The fifth command is a command to cause the chassis unit 100 to travel from the aforementioned specific place to the aforementioned service site. The replacement command as above is sent to the chassis unit 100 selected in step S104 through the communication unit 304 (step S106).

When the chassis unit 100 receives the above replacement command, the operation plan creation part F110 of the chassis unit 100 creates an operation plan based on the replacement command. As described before, the operation plan includes data specifying the planned travel route of the chassis unit 100 by a set of road links and data specifying operations to be performed by the chassis unit 100 at specified locations in the planned travel route. In this case, the planned travel route is a route starting from the aforementioned service site to the aforementioned specific place and then returning to the service site. The specified locations in the planned travel route are the service site and the specific place. The operation to be performed by the chassis unit 100 at the service site is to couple the chassis unit 100 with the second vehicle body unit 200B. The operation to be performed by the chassis unit 100 at the specific place is to separate the chassis unit 100 from the second vehicle body unit 200B and to couple the chassis unit 100 with the first vehicle body unit 200A. After the operation plan as above is created, firstly at the service site, the coupling control part F140 of the chassis unit 100 controls an external apparatus or equipment of the chassis unit 100 to couple the chassis unit 100 with the second vehicle body unit 200B. The second vending machine 210B mounted on the second vehicle body unit 200B should have already been replenished with the products same as those sold by the first vending machine 210A. After the completion of coupling of the chassis unit 100 and the second vehicle body unit 200B at the service site, the travel control part F130 causes the chassis unit 100 to start travelling. The travel control part F130 controls the travel of the chassis unit 100 by controlling the driving unit 106 based on the operation plan, environment data created by the environment perceiving part F120, and location information acquired by the location information acquisition unit 105. In this way the chassis unit 100 can travel autonomously from the service site to the specific place. In consequence, the chassis unit 100 can transport the second vehicle body unit 200B from the service site to the specific place. When the chassis unit 100 arrives at the specific place, the coupling control part F140 separates the chassis unit 100 and the second vehicle body unit 200B. Thus, the second vehicle body unit 200B is laid at the specific place. Then, the coupling control part F140 couples the chassis unit 100 with the first vehicle body unit 200a. After the completion of coupling of the chassis unit 100 and the first vehicle body unit 200A, the travel control part F130 causes the chassis unit 100 to restart travelling. The travel control part F130 controls chassis unit 100 to travel autonomously from the specific place to the service site by controlling the driving unit 106 based on the operation plan, environment data, and location information acquired by the location information acquisition unit 105. Thus, the chassis unit 100 can transport the first vehicle body unit 200A from the specific place to the service site. Consequently, it is possible to perform maintenance of the first vehicle body unit 200A transported to the service site including replenishment of the first vending machine 210A with products. The replacement of the first vending machine 210A with the second vending machine 210B done in the above manner can save the serviceperson's effort of going to the specific place and replenishing the vending machine with products.

The vending machine system according to the embodiment can replenish vending machines 210 with products efficiently. This allows vending machines 210 to be installed at places remote from the service sites.

<First Modification>

Products sold by the vending machine 210 may be changed to other kinds of products with the start of sale of a new product or the turn of seasons or based on the record of sales. For example, when a new successor of a product sold by the vending machine 210 goes on sale, it may be necessary to change the product sold by the vending machine 210 to the new product. It may also be necessary to change products sold by the vending machine 210 with the turn of seasons, because the user's needs may be different between summer and winter. If the record of sales of a product sold by the vending machine 210 is low, it may be necessary to change the product sold to another product. As above, there may arise the need for changing products sold by the first vending machine 210A to other products in various situations.

In view of the above, the time for maintenance determination part F310 in the system according to the first modification may be configured to determine the time for maintenance as a time to change products sold by the vending machine 210. The vending machine system configured in this way can save the serviceperson's effort of going to the place where the vending machine 210 is installed and changing the products sold by the vending machine 210. Therefore, the vending machine system can change products sold by the vending machine 210 efficiently. This allows vending machines 210 to be installed at places remote from the service sites.

<Second Modification>

In the case where the vending machine 210 is one configured to rent out products, it is necessary to perform inspection and maintenance of the products periodically in order to maintain the quality of the products. To this end, the time for maintenance determination part F310 in the system according to the second modification may be configured to determine the time for maintenance as a time to perform inspection and maintenance of the products rent out by the vending machine 210. In this case, the time for maintenance may be determined based on, for example, the number of times of rental or the elapsed time since the completion of the last inspection and maintenance of the products. The vending machine system configured in this way can save the serviceperson's effort of going to the place where the vending machine 210 is installed and performing inspection and maintenance of the products. Therefore, the vending machine system can perform inspection and maintenance of the products rented out by the vending machine 210 efficiently. This allows vending machines 210 to be installed at places remote from the service sites.

<Third Modification>

To maintain the performance of the vending machine 210, it is necessary to perform inspection and maintenance of the vending machine 210 appropriately. To this end, the time for maintenance determination part F310 in the system according to the third modification may be configured to determine the time for maintenance as a time to perform inspection and maintenance of the vending machine 210. In this case, the time for maintenance may be determined based on, for example, the operation time since the completion of the last inspection and maintenance of the vending machine 210. The vending machine system configured in this way can save the serviceperson's effort of going to the place where the vending machine 210 is installed and performing inspection and maintenance of the vending machine 210. Therefore, the vending machine system can perform inspection and maintenance of the vending machine 210 efficiently. This allows vending machines 210 to be installed at places remote from the service sites.

<Fourth Modification>

In the case where the vending machine 210 is configured in such a way as to operate by electrical power supplied by the battery 205, the vending machine 210 cannot operate properly when the remaining capacity of the battery 205 becomes small. In view of this, the time for maintenance determination part F310 in the system according to the fourth modification may be configured to determine the time for maintenance as the time when the remaining capacity of the battery 205 becomes smaller than a predetermined lower limit. In this case, the vehicle body unit 200 or the vending machine 210 may be configured to send information about the remaining capacity of the battery 205 to the server apparatus 300 at predetermined intervals. Alternatively, the vehicle body unit 200 or the vending machine 210 may be configured to send information about the remaining capacity of the battery 205 to the server apparatus 300 when the remaining capacity of the battery 205 becomes smaller than the predetermined lower limit. The vending machine system configured in this way can save the serviceperson's effort of going to the place where the vending machine 210 is installed and charging or replacing the battery 205. Therefore, the vending machine system can perform management of the battery 205 efficiently. This allows vending machines 210 to be installed at places remote from the service sites.

The vending machine 210 in operation can suffer a trouble such as breakdown. In view of this, the time for maintenance determination part F310 in the system according to the fifth modification may determine the time for maintenance as the time when a trouble of the vending machine 210 is detected. The vending machine system configured in this way can save the serviceperson's effort of going to the place where the vending machine 210 is installed and repairing the vending machine 210.

Therefore, the vending machine system can repair the vending machine 210 efficiently. This allows vending machines 210 to be installed at places remote from the service sites.

<Sixth Modification>

In cases where the vending machine 210 is configured to sell or rent out a product in exchange for payment of a fee in cash, there may be cases where the vending machine 210 cannot sell or rent out a product properly due to shortage of coins and/or bills for change stored in the vending machine 210. In view of this, the time for maintenance determination part F310 in the system according to the sixth modification may determine the time for maintenance as the time when the numbers of coins and/or bills stored in the vending machine 210 becomes lower than a predetermined lower limit(s). The vending machine system configured in this way can save the serviceperson's effort of going to the place where the vending machine 210 is installed and replenishing the vending machine 210 with coins and/or bills for change. Therefore, the vending machine system can replenish the vending machine 210 with coins and/or bills for change efficiently. This allows vending machines 210 to be installed at places remote from the service sites.

While in the systems according to the embodiment and the first to sixth modifications, determination of the time for maintenance and creation of the replacement command are performed by the server apparatus 300, they may be performed by the chassis unit 100 instead. In other words, the processing executed by the time for maintenance determination part F310 and the processing executed by the replacement command creation part F320 may be performed by the chassis unit 100. Specifically, the functions same as the time for maintenance determination part F310 and the replacement command creation part F320 may be implemented by executing programs stored in the main storage unit 102 or the auxiliary storage unit 103 of the chassis unit 100 by the processor 101.

<Others>

The above embodiment and modifications have been described only by way of example. Changes can be made to the above embodiment and modifications without departing from the essence of the present disclosure. For examples, features of the above embodiment and modifications may be employed in any possible combination.

The processing and means that have been described in this disclosure may be employed in any combination so long as it is technically feasible to do so. One, some, or all of the processes that have been described as processes performed by a single apparatus may be performed by a plurality of apparatuses in a distributed manner. One, some, or all of the processes that have been described as processes performed by a plurality of apparatuses may be performed by a single apparatus. The hardware configuration employed to implement various functions in a computer system may be modified flexibly.

The present disclosure can be carried out by supplying a computer program(s), or information processing program(s), that implements the functions described in the above description of the embodiment to a computer to let one or more processors of the computer read and execute the program(s). Such a computer program(s) may be supplied to the computer by a computer-readable, non-transitory storage medium that can be connected to a system bus of the computer, or through a network. The computer-readable, non-transitory storage medium refers to a recording medium that can store information, such as data and programs, electrically, magnetically, optically mechanically, or chemically in such a way as to allow the computer or the like to read the stored information. Examples of the computer-readable, non-transitory storage medium include any type of disc medium including a magnetic disc, such as a floppy disc (registered trademark) and a hard disk drive (HDD), and an optical disc, such as a CD-ROM, a DVD, and a Blu-ray disc. Further examples of the computer-readable, non-transitory storage medium include a read-only memory (ROM), a random access memory (RAM), an EPROM, an EEPROM, a magnetic card, a flash memory, an optical card, and a solid state drive (SSD).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising a controller configured to execute the processing of:
when a first vehicle body unit on which a first vending machine is mounted is laid at a specific place, determining a first time for maintenance defined as a time to perform maintenance of the first vending machine; and
sending a replacement command to a chassis unit that is configured in such a way as to be capable of travelling autonomously and being coupled to and separated from a vehicle body unit, as per the first time for maintenance, the replacement command being a command to transport a second vehicle body unit on which a second vending machine is mounted to the specific place and retrieve the first vehicle body unit from the specific place,
wherein the replacement command includes:
a command to couple the chassis unit with the second vehicle body unit
a command to cause the chassis unit to travel to the specific place:
a command to separate the chassis unit from the second vehicle body unit at the specific place;
a command to couple the chassis unit with the first vehicle body unit at the specific place; and
a command to cause the chassis unit to travel to a place where maintenance of the first vending machine is to be performed,
wherein the controller determines the first time for maintenance as a time when the remaining capacity of a battery that supplies electrical power on which the first vending machine operates becomes smaller than a predetermined lower limit.

2. An The information processing apparatus according to claim 1, wherein the controller determines a second time for maintenance defined as a time to perform maintenance of the first vending machine as a time when the number of products in stock in the first vending machine becomes smaller than a predetermined lower limit.

3. The information processing apparatus according to claim 1, wherein the controller determines a third time for maintenance defined as a time to perform maintenance of the first vending machine as a time when a product sold by the first vending machine is to be changed to another product.

4. The information processing apparatus according to claim 1, wherein the controller determines a fourth time for maintenance defined as a time to perform maintenance of the first vending machine as a time to perform inspection and maintenance of a product rented out by the first vending machine.

5. The information processing apparatus according to claim 1, wherein the controller determines a fifth time for maintenance defined as a time to perform maintenance of the first vending machine as a time to perform inspection and maintenance of the first vending machine.

6. The information processing apparatus according to claim 1, wherein the controller determines a sixth for maintenance defined as a time to perform maintenance of the first vending machine as a time when a trouble of the first vending machine occurs.

7. The information processing apparatus according to claim 1, wherein the controller determines a seventh time for maintenance defined as a time to perform maintenance of the first vending machine as a time when the number of coins or bills for change in stock in the first vending machine becomes smaller than a predetermined lower limit.

8. An information processing method comprising the following steps of processing executed by a computer:
the first determination step of, when a first vehicle body unit on which a first vending machine is mounted is laid at a specific place, determining a first time for maintenance defined as a time to perform maintenance of the first vending machine; and
the sending step of sending a replacement command to a chassis unit that is configured in such a way as to be capable of travelling autonomously and being coupled to and separated from a vehicle body unit, as per the first time for maintenance, the replacement command being a command to transport a second vehicle body unit on which a second vending machine is mounted to the specific place and retrieve the first vehicle body unit from the specific place,
wherein the replacement command includes:
a command to couple the chassis unit with the second vehicle body unit;
a command to cause the chassis unit to travel to the specific place:
a command to separate the chassis unit from the second vehicle body unit at the specific place;
a command to couple the chassis unit with the first vehicle body unit at the specific place; and
a command to cause the chassis unit to travel to a place where maintenance of the first vending machine is to be performed,
wherein in the first determination step, the first time for maintenance is determined as a time when the remaining capacity of a battery that supplies electrical power on which the first vending machine operates becomes smaller than a predetermined lower limit.

9. The information processing method according to claim 8, the method further comprising the second determination step of processing executed by the computer,
wherein in the second determination step, a second time for maintenance defined as a time to perform maintenance of the first vending machine is determined as a time when the number of products in stock in the first vending machine becomes smaller than a predetermined lower limit.

10. The information processing method according to claim 8, the method further comprising the third determination step of processing executed by the computer,
wherein in the third determination step, a third time for maintenance defined as a time to perform maintenance of the first vending machine is determined as a time when a product sold by the first vending machine is to be changed to a new product.

11. An information processing method according to claim 8, the method further comprising the fourth determination step of processing executed by the computer,
wherein in the fourth determination step, a fourth time for maintenance defined as a time to perform maintenance of the first vending machine is determined as a time to perform inspection and maintenance of a product rented out by the first vending machine.

12. The information processing method according to claim 8, the method further comprising the fifth determination step of processing executed by the computer,
wherein in the fifth determination step, a fifth time for maintenance defined as a time to perform maintenance of the first vending machine is determined as a time to perform inspection and maintenance of the first vending machine.

13. The information processing method according to claim 8, the method further comprising the sixth determination step of processing executed by the computer,
wherein in the sixth determination step, a sixth time for maintenance defined as a time to perform maintenance of the first vending machine is determined as a time when a trouble of the first vending machine occurs.

14. The information processing method according to claim 8, the method further comprising the seventh determination step of processing executed by the computer,
wherein in the seventh determination step, a seventh time for maintenance defined as a time to perform maintenance of the first vending machine is determined as a time when the number of coins or bills for change in stock in the first vending machine becomes smaller than a predetermined lower limit.

15. A vehicle comprising a controller configured to execute the processing of:
when a first vehicle body unit on which a first vending machine is mounted is laid at a specific place, determining a first time for maintenance defined as a time to perform maintenance of the first vending machine; and
causing the vehicle to transport a second vehicle body unit on which a second vending machine is mounted to the specific place and retrieve the first vehicle body unit from the specific place as per the first maintenance time,
wherein the replacement command includes:
a command to couple the chassis unit with the second vehicle body unit;
a command to cause the chassis unit to travel to the specific place:
a command to separate the chassis unit from the second vehicle body unit at the specific place;
a command to couple the chassis unit with the first vehicle body unit at the specific place; and
a command to cause the chassis unit to travel to a place where maintenance of the first vending machine is to be performed,
wherein the controller determines the first time for maintenance as a time when the remaining capacity of a battery that supplies electrical power on which the first vending machine operates becomes smaller than a predetermined lower limit.

\* \* \* \* \*

UNITED STATES PATENT AND TRADEMARK OFFICE
CERTIFICATE OF CORRECTION

| | |
|---|---|
| PATENT NO. | : 11,900,331 B2 |
| APPLICATION NO. | : 17/109542 |
| DATED | : February 13, 2024 |
| INVENTOR(S) | : Katsuhisa Yoshikawa et al. |

It is certified that error appears in the above-identified patent and that said Letters Patent is hereby corrected as shown below:

In the Claims

Claim 1, Column 19, Line 22; insert --;-- after "vehicle body unit"

Claim 2, Column 19, Line 37; delete "An" and replace with -- The --

Signed and Sealed this
Fourteenth Day of May, 2024

Katherine Kelly Vidal
*Director of the United States Patent and Trademark Office*